Feb. 10, 1953   R. W. SELTZER   2,627,635
HOSE CLAMP
Filed June 1, 1951
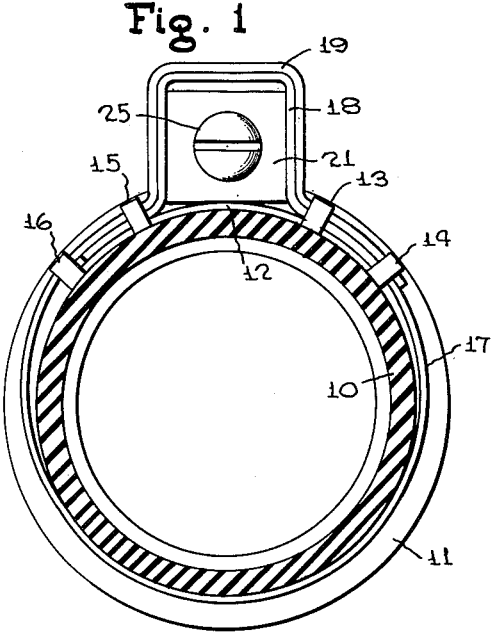
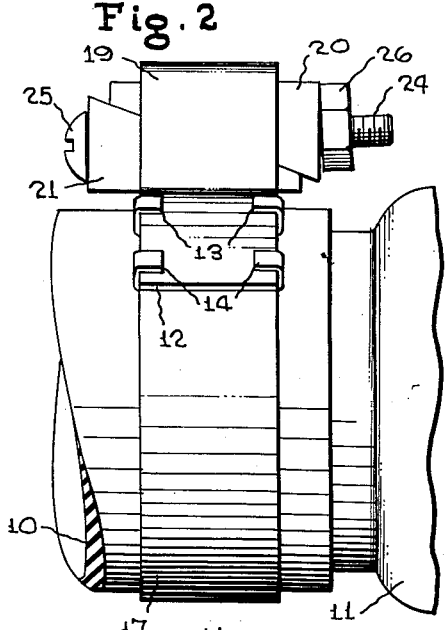
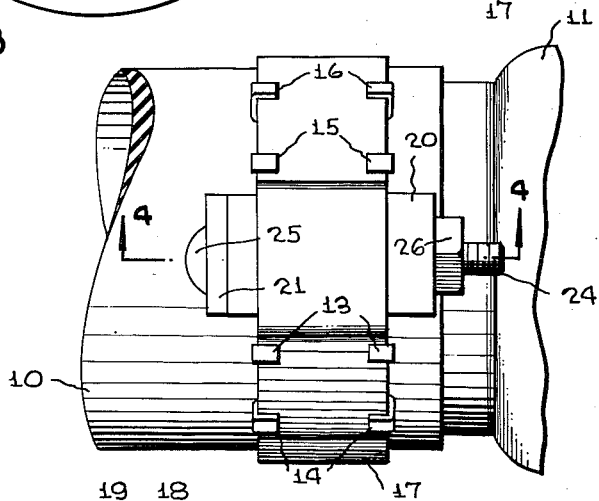
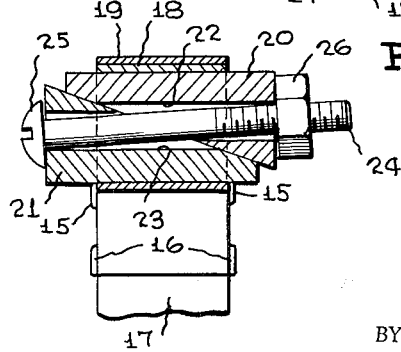
INVENTOR
ROBERT W. SELTZER
BY
McMorrow, Berman & Davidson
ATTORNEYS Patented Feb. 10, 1953

2,627,635

UNITED STATES PATENT OFFICE 2,627,635

HOSE CLAMP

Robert W. Seltzer, Hartford, Conn.

Application June 1, 1951, Serial No. 229,394

1 Claim. (Cl. 24—19)

This invention relates to hose clamps, and more particularly to an adjustable hose clamp having a tightening element extending longitudinally of the associated hose.

It is among the objects of the invention to provide an improved hose clamp having a wide range of adjustment and including cooperating wedges which relieve the tightening screw of the major portion of the strain incident to tightening the clamp; which has a tightening screw disposed longitudinally of the associated hose to facilitate access to the screw for tightening the clamp; and which is simple and durable in construction, economical to manufacture, easy to install and positive and effective in operation.

Other objects and advantages will become apparent from a consideration of the following description and the appended claim in conjunction with the accompanying drawing, wherein:

Figure 1 is an end elevational view of a hose clamp illustrative of the invention, shown applied to a hose illustrated in transverse cross-section;

Figure 2 is a side elevational view of the hose clamp shown applied to a fragmentary portion of an associated hose;

Figure 3 is a view similar to Figure 2 with the hose and clamp rotated through an angle of approximately 90° from the position illustrated in Figure 2; and Figure 4 is a fragmentary cross-sectional view on the line 4—4 of Figure 3.

With continued reference to the drawing, the hose, which may be a rubber hose of known construction, is indicated at 10 and telescopically receives at one end a fitting 11 such as a hose coupling, the outlet fitting of a vehicle radiator or water pump, or other device to which the hose is connected, and the clamp is provided for tightly compressing the end portion of the hose about the associated fitting to provide a leak-proof joint between the hose and the fitting.

The hose clamp comprises an elongated plate 12 of rectangular shape arcuately curved longitudinally and provided with ears projecting from its opposite longitudinal edges and bent to extend transversely of the convex side of the plate. In the arrangement illustrated there are eight of these ears arranged in four pairs with the two ears of each pair extending one from each side of the plate and aligned transversely of the plate. Two pairs of ears are disposed at locations spaced apart longitudinally of the plate and at one side of the mid-length location of the plate and the other two pairs are disposed at locations spaced apart longitudinally of the plate and at the other side of the mid-length location thereof. The ears provide two spaced apart guideways located one guideway near each end of the curved plate and on the convex side of the plate for slidably receiving the end portions of a flexible clamp band. The ears at one side of the mid-length location of the plate are indicated at 13 and 14, and the pairs of ears at the opposite side of the mid-length location of the plate are indicated at 15 and 16.

A flexible band 17 extends around the hose 10 and has one end portion slidably received in the ears 13 and 14, and the other end portion slidably received in the ears 15 and 16. The end portion of the band 17 extending through the ears 13 and 14 is provided adjacent the inner pair of ears 13 with a loop formation 18 of rectangular shape, and the end of the band at the side of the loop formation 18 remote from the ears 13 is inserted under the end portion of the band received in the ears 15 and extends slidably through the pair of ears 15 between the plate 12 and the other end portion of the band. The end portion of the band extending slidably through the pairs of ears 15 and 16 is provided with a rectangular loop formation 19 which overlaps and closely surrounds the loop formation 18 and the portion of this end of the band at the side of the loop formation 19 remote from the pair of tongues 15 is inserted under the ears 13 and 14 and overlies the portion of the band carrying the loop formation 18.

A pair of complementary wedges 20 and 21 are disposed in and extend through the inner loop formation 18 and have inclined surfaces in contact. Each of these wedges is provided with a longitudinally extending bore, as indicated by 22 for the wedge 20 and 23 for the wedge 21. These bores are in registry with each other and a tightening screw 24 extends through the bores in the two wedges and has at one end a head 25 bearing against the larger end of the wedge 21. A nut 26 is threaded onto the other end of the screw and bears against the larger end of the wedge 20.

With this arrangement, when the nut 26 is tightened on the screw 24, the wedges 20 and 21 are moved relative to each other in a manner to exert a band-tightening pressure between the loop formations 18 and 19 and the portion of the plate 12 between the pairs of ears 13 and 15. This tightening pressure pulls the flexible band 17 tightly around the hose to compress the hose around the fitting 11 and the wedges relieve the screw 24 of the major portion of the band-tightening stress.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A hose clamp comprising a plate curved longitudinally to extend transversely of a hose to be clamped; a pair of ears at each end of the plate, the ears of each pair extending transversely of and above the convex side of the plate toward one another to provide a guideway at each end of the plate; an elongated, flexible band proportioned to encircle said hose and having overlapping ends, one end of the band extending a substantial distance within and being slidably engaged in one guideway, and the other end of the band extending a substantial distance within and being slidably engaged in the other guideway, said band having formed therein, adjacent its respective ends, overlapping loops of inverted U-shape disposed between the guideways and having their bights spaced above the mid-length area of the plate; a pair of complementary, tapered wedges extending transversely of the plate and band in the space between said bights and said plate and arranged for forcing the bights away from the plate responsive to movement of the wedges toward one another, each of said wedges having a longitudinal bore of circular cross section opening at its opposite ends upon the wide end of the wedge and one of the tapered side surfaces thereof, the sidewall of said bore being closed between the ends thereof; a bolt extending through said bores and having a head engaging one wedge at its wide end; and a nut threaded on the bolt engaging the wide end of the other wedge to draw the wedges toward one another responsive to threading of the nut toward said head of the bolt.

ROBERT W. SELTZER.

REFERENCES CITED

The following references are of record in the file of this patent:

UNITED STATES PATENTS

| Number | Name | Date |
|---|---|---|
| 684,835 | Littell | Oct. 22, 1901 |
| 1,584,332 | Tetzlaff | May 11, 1926 |
| 1,692,798 | Potter | Nov. 20, 1928 |
| 1,782,680 | Fay et al. | Nov. 25, 1930 |
| 2,474,062 | Murphy | June 21, 1949 |

FOREIGN PATENTS

| Number | Country | Date |
|---|---|---|
| 337,002 | Germany | May 23, 1921 |